United States Patent
Haruna (10) Patent No.: US 11,380,149 B2
(45) Date of Patent: *Jul. 5, 2022

(54) LOCKING AND UNLOCKING SYSTEM, PORTABLE TERMINAL CAPABLE OF COMMUNICATING WITH SERVER, LOCKING AND UNLOCKING METHOD EXECUTED BY PORTABLE TERMINAL, AND NON-TRANSITORY STORAGE MEDIUM STORING PROGRAM

(71) Applicant: TOYOTA JIDOSHA KABUSHIKI KAISHA, Toyota-shi (JP)

(72) Inventor: Yuichiro Haruna, Oyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,422

(22) Filed: Jun. 7, 2019

(65) Prior Publication Data

US 2019/0287328 A1 Sep. 19, 2019

Related U.S. Application Data (63) Continuation of application No. 15/631,635, filed on Jun. 23, 2017.

(51) Int. Cl.
  *G07C 9/00* (2020.01)
  *G06F 21/44* (2013.01)
  (Continued)

(52) U.S. Cl.
  CPC ......... *G07C 9/00174* (2013.01); *G06F 21/44* (2013.01); *G07C 9/00309* (2013.01);
  (Continued)

(58) Field of Classification Search
  CPC ............... G06Q 10/02; G06Q 30/0645; G06Q 10/1093; G06Q 60/30; G07C 2009/00396;
  (Continued)

(56) References Cited

U.S. PATENT DOCUMENTS 9,171,268 B1* 10/2015 Penilla .................... H04W 4/44
9,367,217 B2* 6/2016 Moore, Jr. ............. G06Q 10/02
(Continued)

FOREIGN PATENT DOCUMENTS

CN 107545628 A 1/2018
JP 2002-183563 A 6/2002
(Continued)

OTHER PUBLICATIONS

Office Action dated Jan. 24, 2019 in U.S. Appl. No. 15/632,854.
(Continued)

*Primary Examiner* — Daryl C Pope
(74) *Attorney, Agent, or Firm* — Oblon, McClelland, Maier & Neustadt, L.L.P.

(57) ABSTRACT

A locking and unlocking system includes a portable terminal and a server. The portable terminal includes a service providing unit, a first sending unit, and a first receiving unit. The service providing unit provides a use reservation service for a vehicle or facilities by communicating with another server. The first sending unit sends a first signal to the server in response to a request from the service providing unit. The first signal requests authentication information used for locking and unlocking. The first receiving unit receives the authentication information from the server. The server includes a second receiving unit and a second sending unit. The second sending unit sends a second signal including the authentication information to the portable terminal when the second receiving unit receives the first signal.

18 Claims, 4 Drawing Sheets

(51) Int. Cl.
*H04W 4/02* (2018.01)
*H04W 4/80* (2018.01)
*H04L 29/08* (2006.01)
*H04L 67/62* (2022.01)

(52) U.S. Cl.
CPC .. *G07C 9/00571* (2013.01); *G06F 2221/2129* (2013.01); *G07C 2009/0088* (2013.01); *G07C 2009/00769* (2013.01); *H04L 67/325* (2013.01); *H04W 4/02* (2013.01); *H04W 4/80* (2018.02)

(58) Field of Classification Search
CPC ...... G07C 9/00896; G07C 2009/00865; G07C 2009/00936; G07C 2009/00769; G07C 9/00174; G06F 21/44; G06F 2221/2129
USPC .......... 340/542, 425.5, 426.1, 539.1, 539.11, 340/539.13, 901–905
See application file for complete search history.

(56) References Cited

U.S. PATENT DOCUMENTS

| | | |
|---|---|---|
| 2014/0337862 A1 | 11/2014 | Valencia et al. |
| 2015/0040203 A1 | 2/2015 | Qian |
| 2015/0267438 A1 | 9/2015 | Martinez |
| 2016/0044472 A1 | 2/2016 | Person |
| 2016/0140649 A1 | 5/2016 | Kleve et al. |
| 2017/0134382 A1 | 5/2017 | Darnell et al. |
| 2017/0178035 A1* | 6/2017 | Grimm .................. G06Q 10/02 |
| 2017/0372546 A1* | 12/2017 | Haruna .................. G06F 21/44 |
| 2017/0372547 A1 | 12/2017 | Fujiwara et al. |
| 2018/0024725 A1* | 1/2018 | Penilla .................. G07C 5/008 701/49 |

FOREIGN PATENT DOCUMENTS

| | | |
|---|---|---|
| JP | 2004-190233 A | 7/2004 |
| JP | 2006-118122 | 5/2006 |
| JP | 2013-234519 | 11/2013 |
| JP | 2014-40717 A | 3/2014 |
| JP | 2014-148875 A | 8/2014 |
| JP | 2014-531642 A | 11/2014 |
| JP | 2016-4342 A | 1/2016 |
| WO | WO 2013/034592 A1 | 3/2013 |

OTHER PUBLICATIONS

Office Action dated Apr. 5, 2018 in U.S. Appl. No. 15/632,854, 14 pages.
Office Action dated Nov. 20, 2017 in U.S. Appl. No. 15/632,854, 14 pages.
Office Action dated Sep. 24, 2018 in U.S. Appl. No. 15/632,854.
Office Action dated Jul. 5, 2019 in U.S. Appl. No. 15/632,854.
Supplemental Notice of Allowability issued to U.S. Appl. No. 15/631,635 dated Jun. 26, 2019.
Supplemental Notice of Allowability issued to U.S. Appl. No. 15/631,635 dated Oct. 15, 2019.
Final Office Action issued to U.S. Appl. No. 15/632,854 dated Jan. 16, 2020.
Office Action issued to U.S. Appl. No. 15/632,854 dated Jun. 29, 2020.
Notice of Allowance issued to U.S. Appl. No. 15/632,854 dated Apr. 5, 2021.
Corrected Notice of Allowance issued to U.S. Appl. No. 15/632,854 dated Jul. 20, 2021.

* cited by examiner

FIG. 2

LOCKING AND UNLOCKING SYSTEM, PORTABLE TERMINAL CAPABLE OF COMMUNICATING WITH SERVER, LOCKING AND UNLOCKING METHOD EXECUTED BY PORTABLE TERMINAL, AND NON-TRANSITORY STORAGE MEDIUM STORING PROGRAM

INCORPORATION BY REFERENCE

This application is a Continuation of U.S. application Ser. No. 15/631,635, filed Jun. 23, 2017, which is based upon and claims the benefit of priority from Japanese Patent Application No. 2016-128205 filed on Jun. 28, 2016, the entire contents of each of which are incorporated herein by reference.

BACKGROUND

1. Technical Field

The present disclosure relates to a locking and unlocking system, a portable terminal capable of communicating with a server, a locking and unlocking method executed by the portable terminal, and a non-transitory storage medium storing a program.

2. Description of Related Art

A key management system is disclosed in which a portable terminal can be used as an electronic key by receiving, by the portable terminal, authentication information for unlocking a vehicle from a server via a network (See, for example, Japanese Patent Application Publication No. 2006-118122 (JP 2006-118122 A)).

The use of such a configuration saves time and effort for handing over an electronic key when a plurality of users use the same vehicle, such as a rental car, a shared car, or a company car, in different time zones, thus improving user convenience.

A similar technique can be used for locking and unlocking the same facilities (for example, a conference room, recreation facilities, a gymnasium, etc.) that a plurality of users use in different time zones. Using a portable terminal as an electronic key for a locking and unlocking device installed in such facilities improves user convenience.

SUMMARY

In the meantime, when an application program (an existing application), created by a third party, is already available for use by a portable terminal with which a user can make a use reservation for a vehicle or facilities, the existing application may be used to accept a use reservation for a vehicle or the facilities.

However, in a configuration in which authentication information is stored in a server, corresponding to an existing application, and the authentication information is sent from the server to a user who has made a use reservation, there is room for improvement from the viewpoint of security because the server in which the authentication information is stored is managed, for example, by a third party.

In view of this, the present disclosure provides a locking and unlocking system, a portable terminal capable of communicating with a server, a locking and unlocking method executed by the portable terminal, and a non-transitory storage medium storing a program, all of which can reduce the leakage of authentication information, used for locking or unlocking a vehicle or facilities, when use reservations are accepted via an existing application when a plurality of users will use the same vehicle or facilities in different time zones.

A first aspect of the disclosure provides a locking and unlocking system. The locking and unlocking system according to the first aspect includes: a portable terminal; and a server capable of communicating with the portable terminal. The portable terminal includes: a service providing unit; a first sending unit; and a first receiving unit. The service providing unit is configured to provide a use reservation service for a vehicle or facilities by communicating with another server different from the server. The first sending unit is configured to send a first signal to the server in response to a request from the service providing unit, when a first operation is performed during execution of processing by the service providing unit for providing the use reservation service. The first signal requests authentication information used for locking and unlocking the vehicle or the facilities. And the first receiving unit is configured to receive the authentication information from the server. And the server includes: a second receiving unit and a second sending unit. The second receiving unit is configured to receive the first signal from the portable terminal. And the second sending unit is configured to send a second signal to the portable terminal when the second receiving unit receives the first signal. The second signal includes the authentication information.

According to the aspect described above, the authentication information is transferred and managed in the locking and unlocking system as follows. That is, in response to a call from the service providing unit (existing application) that provides the use reservation service for a vehicle or facilities, the first sending unit of the portable terminal requests the server, different from the other server to which the existing application is connected, to return the authentication information used for unlocking the vehicle or facilities. After that, the first receiving unit of the portable terminal receives the authentication information from the server different from the other server. This means that, since the authentication information is stored in the server, different from the other server connected to the existing application, and is managed according to a dedicated security policy, the leakage of the authentication information to the outside world can be reduced.

In the first aspect of the disclosure, the portable terminal may include a third sending unit configured to send a third signal to a predetermined device provided in the vehicle or the facilities in response to a request from the service providing unit when a second operation is performed during execution of processing by the service providing unit for providing the use reservation service. The third signal may include the authentication information. The third signal may request locking or unlocking of the vehicle or the facilities.

In the first aspect of the disclosure, the use reservation service may be executed by an application program installed in the portable terminal. And the first sending unit may be configured to send the first signal to the server, when a user performs the first operation on the portable terminal during execution of the application program.

In the first aspect of the disclosure, the first sending unit may be configured to send the first signal to the server, when the user performs an input operation on the portable terminal to cause the portable terminal to send information during execution of the application program. The information may include a use reservation for the vehicle or the facilities.

In the first aspect of the disclosure, the server may be managed by another organization different from an organization managing the other server.

In the first aspect of the disclosure, the third sending unit may be configured to send the third signal to the predetermined device when an operation to lock or unlock the vehicle or the facilities is performed.

A second aspect of the disclosure provides a portable terminal capable of communicating with a server. The portable terminal according to the second aspect includes: a service providing unit; a first sending unit; and a first receiving unit. The service providing unit is configured to provide a use reservation service for a vehicle or facilities by communicating with another server different from the server. The first sending unit is configured to send a first signal to the server in response to a request from the service providing unit, when a first operation is performed during execution of processing by the service providing unit for providing the use reservation service. The first signal requests authentication information used for locking and unlocking the vehicle or the facilities. And the first receiving unit is configured to receive the authentication information from the server.

In the second aspect of the disclosure, the portable terminal capable of communicating with the server may include a third sending unit configured to send a third signal to a predetermined device provided in the vehicle or the facilities in response to a request from the service providing unit when a second operation is performed during execution of processing by the service providing unit for providing the use reservation service. The third signal may include the authentication information. The third signal may request locking or unlocking of the vehicle or the facilities.

In the second aspect of the disclosure, the use reservation service may be executed by an application program installed in the portable terminal. And the first sending unit may be configured to send the first signal to the server, when a user performs the first operation on the portable terminal during execution of the application program.

In the second aspect of the disclosure, the first sending unit may be configured to send the first signal to the server when the user performs an input operation on the portable terminal to cause the portable terminal to send information during execution of the application program. The information may include a use reservation for the vehicle or the facilities.

In the second aspect of the disclosure, the server may be managed by another organization different from an organization managing the other server.

In the second aspect of the disclosure, the third sending unit may be configured to send the third signal to the predetermined device when an operation to lock or unlock the vehicle or the facilities is performed.

A third aspect of the disclosure provides a locking and unlocking method executed by a portable terminal. The portable terminal includes a service providing unit, a first sending unit, and a first receiving unit. The portable terminal is capable of communicating with a server in which authentication information is stored. The locking and unlocking method according to the third aspect includes: providing, by the service providing unit, a use reservation service for a vehicle or facilities by communicating with another server different from the server; sending, by the first sending unit, a first signal to the server in response to a request from the service providing unit when a first operation is performed during execution of processing by the service providing unit for providing the use reservation service, the first signal requesting the authentication information used for locking and unlocking the vehicle or the facilities; and receiving, by the first receiving unit, the authentication information from the server.

In the third aspect of the disclosure, the portable terminal may include a third sending unit. And the locking and unlocking method executed by the portable terminal may include: sending, by the third sending unit, a third signal to a predetermined device provided in the vehicle or the facilities in response to a request from the service providing unit, when a second operation is performed during execution of processing by the service providing unit for providing the use reservation service. The third signal may include the authentication information. The third signal may request locking or unlocking of the vehicle or the facilities.

In the third aspect of the disclosure, the use reservation service may be executed by an application program installed in the portable terminal. And the first signal may be sent to the server by the first sending unit when a user performs the first operation on the portable terminal during execution of the application program.

In the third aspect of the disclosure, the first signal may be sent to the server by the first sending unit when the user performs an input operation on the portable terminal to cause the portable terminal to send information during execution of the application program. The information may include a use reservation for the vehicle or the facilities.

In the third aspect of the disclosure, the server may be managed by another organization different from an organization managing the other server.

In the third aspect of the disclosure, sending the third signal to the predetermined device when the second operation is performed may include sending the third signal to the predetermined device when an operation to lock or unlock the vehicle or the facilities is performed.

A fourth aspect of the disclosure provides a non-transitory storage medium storing a program, the program being installed in a portable terminal capable of communicating with a first server in which authentication information is stored and a second server which provides a use reservation service for a vehicle or facilities, the authentication information being used for locking or unlocking the vehicle or the facilities. The program is configured to cause the portable terminal to: provide the use reservation service by communicating with the second server; and send a first signal to the first server, when a first operation is performed, the first operation relating to a reservation made by the use reservation service, the first signal requesting the first server to send the authentication information used for locking and unlocking the vehicle or the facilities to the portable terminal.

According to the aspects described above, the present disclosure provides a locking and unlocking system, a portable terminal capable of communicating with a server, a locking and unlocking method executed by the portable terminal, and a non-transitory storage medium storing a program, all of which can reduce the leakage of authentication information, used for locking or unlocking a vehicle or facilities, when use reservations are accepted via an existing application when a plurality of users will use the same vehicle or facilities in different time zones.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment will be described below with reference to the drawings.

First, with reference to FIG. 1 and FIG. 2, a configuration of a locking/unlocking system 1 according to this embodiment will be described.

Figure 1:
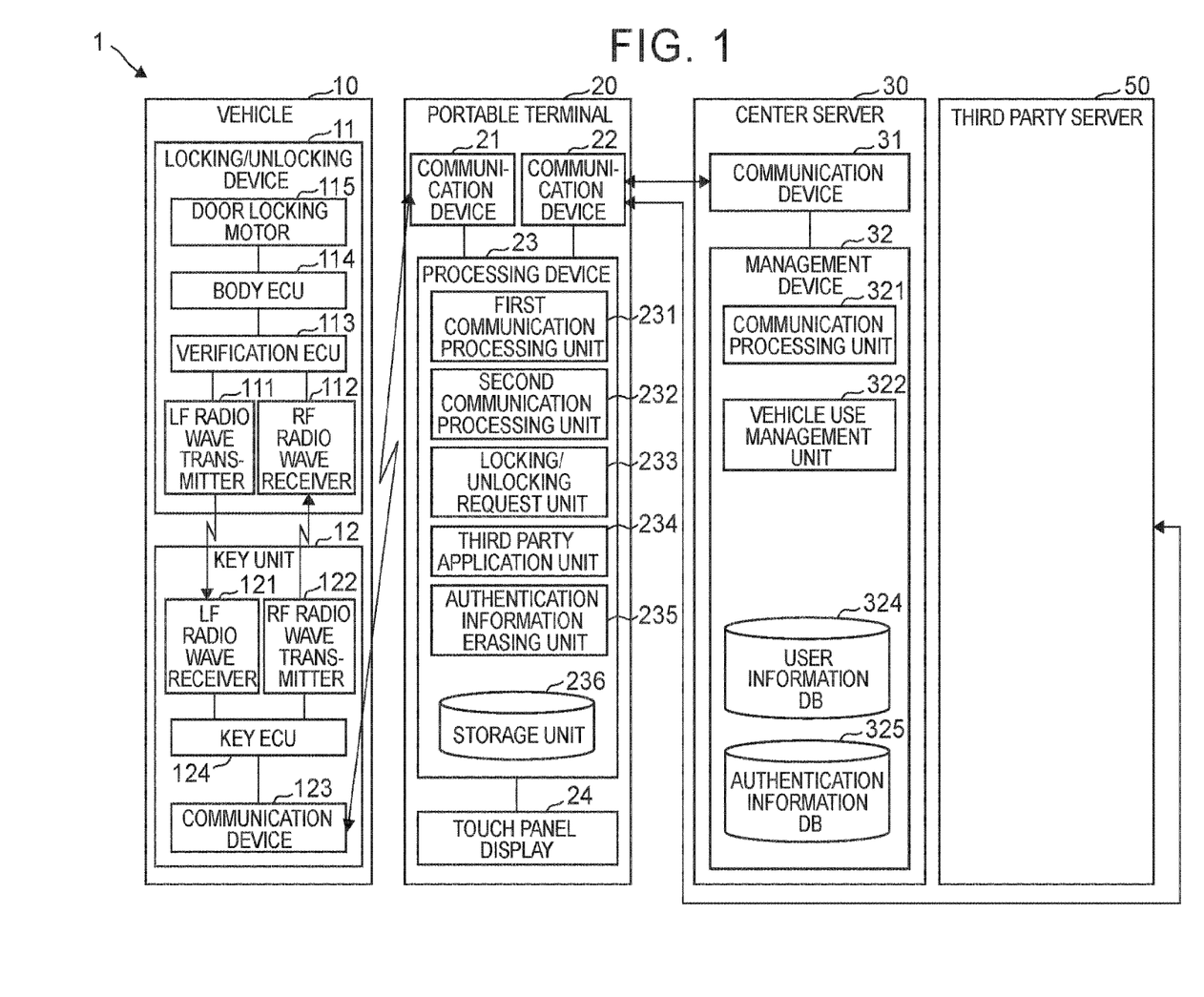
FIG. 1 is a block diagram generally showing an example of a configuration of a locking/unlocking system.
Figure 2:
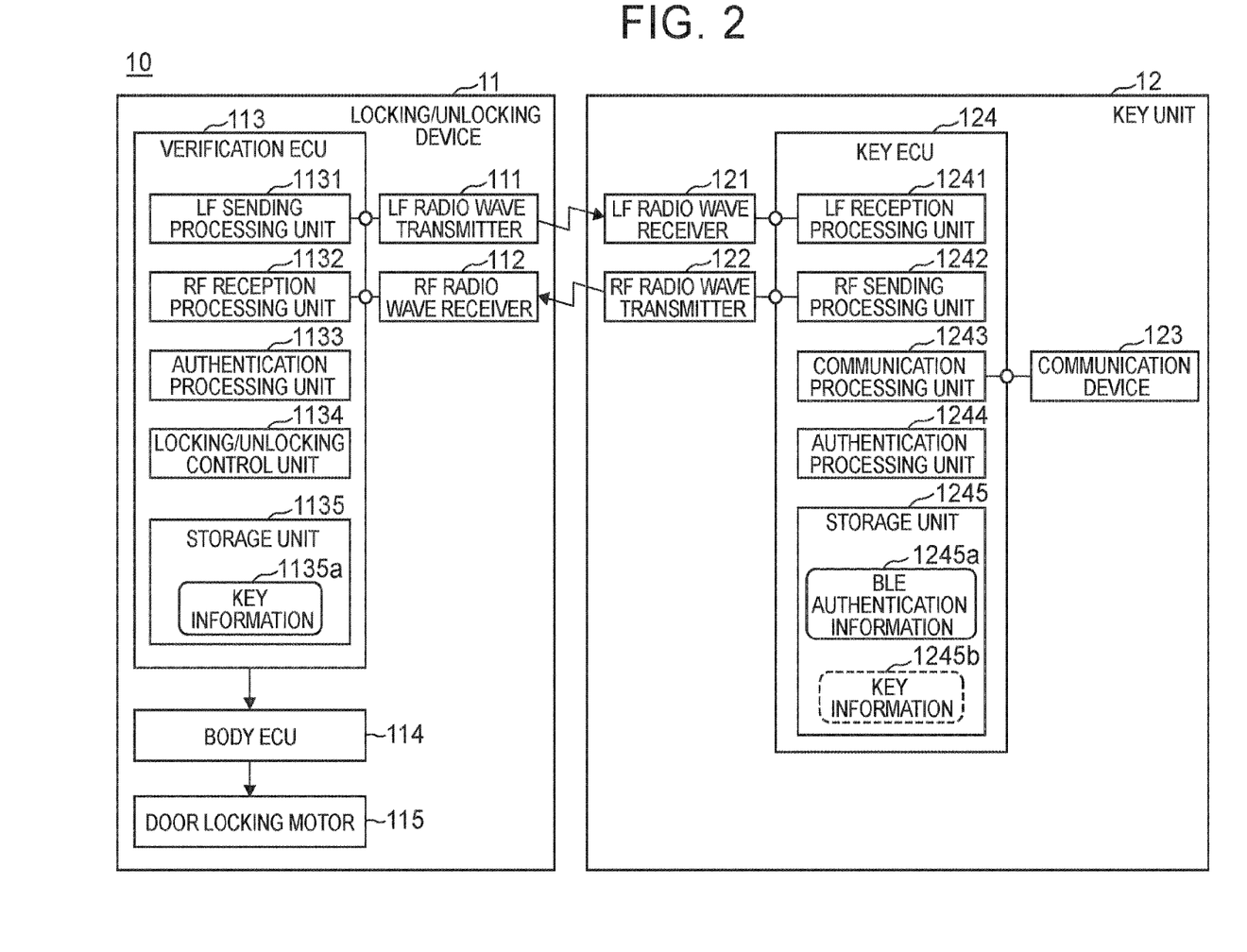
FIG. 2 is a configuration diagram generally showing an example of a configuration of a locking/unlocking device and a key unit.

FIG. 1 is a block diagram generally showing an example of a configuration of the locking/unlocking system 1 according to this embodiment. FIG. 2 is a block diagram generally showing an example of a configuration of a locking/unlocking device 11 and a key unit 12 included in a vehicle 10.

The locking/unlocking system 1 includes the vehicle 10, a portable terminal 20, and a center server 30. In addition, the locking/unlocking system 1 includes a third party server 50 as a component related to the locking/unlocking system 1.

The vehicle 10 is a target for which locking/unlocking (locking and unlocking) is performed in the locking/unlocking system 1. The vehicle 10 includes the locking/unlocking device 11 and the key unit 12.

The vehicle 10 in this embodiment is assumed to be a vehicle that can be used by a plurality of users in different time zones, such as a rental car, a shared car (provided by either a business operator or an individual), or a pool car in an organization.

The locking/unlocking device 11 locks and unlocks the door of the vehicle 10 in response to the lock signal and the unlock signal (both of which are an example of the second request) sent from the key unit 12 as radio waves in the Radio Frequency (RF: high frequency) band (for example, 300 MHz to 3 GHz) (hereinafter referred to as "RF radio waves"). The locking/unlocking device 11 includes a Low Frequency (LF) radio wave transmitter 111, an RF radio wave receiver 112, a verification Electronic Control Unit (ECU) 113, a body ECU 114, and a door locking motor 115.

The locking/unlocking device 11 operates on electric power supplied from an auxiliary battery (not shown) mounted on the vehicle 10.

The LF radio wave transmitter 111, incorporated for example in the center console in the vehicle interior or in the door handle, sends radio waves in the LF band (for example, 30 Hz to 300 kHz) (hereinafter referred to as "LF radio waves") under the control of the verification ECU 113 (LF sending processing unit 1131 that will be described later).

The RF radio wave receiver 112, provided for example in the trim of the cargo room of the vehicle 10, receives RF radio waves under the control of the verification ECU 113 (RF reception processing unit 1132 that will be described later).

The verification ECU 113 is an electronic control unit that controls the locking and unlocking of the door of the vehicle 10 in response to the lock signal and the unlock signal received from the key unit 12. The verification ECU 113, which is for example configured mainly by a microcomputer, executes programs, stored in the ROM, on the CPU for implementing various control processing. The verification ECU 113 includes an LF sending processing unit 1131, an RF reception processing unit 1132, an authentication processing unit 1133, and a locking/unlocking control unit 1134 each as a functional unit implemented by executing one or more programs on the CPU. In addition, the verification ECU 113 includes a storage unit 1135 implemented as a storage area in the internal memory.

The LF sending processing unit 1131 sends LF radio waves to the vehicle interior and the vehicle exterior through the LF radio wave transmitter 111.

The RF reception processing unit 1132 receives RF radio waves through the RF radio wave receiver 112. More specifically, the RF reception processing unit 1132 receives the lock signal and the unlock signal sent from the key unit as the RF radio wave.

The authentication processing unit 1133 performs authentication based on the key information (key information 1245b that will be described later), included in the lock signal or the unlock signal, when the RF reception processing unit 1132 receives the lock signal or the unlock signal. More specifically, the authentication processing unit 1133 determines that the authentication is successful if key information 1135a, registered in advance in the storage unit 1135, and the key information, included in the lock signal or the unlock signal, match, and determines that the authentication is not successful if they do not match.

The locking/unlocking control unit 1134 sends the lock command (when the RF reception processing unit 1132 receives the lock signal) or the unlock command (when the RF reception processing unit 1132 receives the unlock signal) to the body ECU 114 through an in-vehicle network, such as the Controller Area Network (CAN), if the authentication by the authentication processing unit 1133 is successful.

The body ECU 114 is an electronic control unit that controls the operation of the door locking motor 115 communicably connected through one-to-one communication lines. The body ECU 114 outputs the control command, which causes the door locking motor 115 to perform the locking operation, in response to the lock command from the verification ECU 113. In addition, the body ECU 114 outputs the control command, which causes the door locking motor 115 to perform the unlocking operation, in response to the unlock command from the verification ECU 113.

The door locking motor 115 is a known electric actuator for locking and unlocking the door (including the trunk lid, the back door, etc.) of the vehicle 10 in response to the control command from the body ECU 114.

The key unit 12, arranged inside the vehicle 10 (vehicle interior), sends the lock signal and the unlock signal to the locking/unlocking device 11 as RF radio waves in response to each of the lock request and the unlock request (both are an example of the first request) sent from the portable terminal 20. The key unit 12 includes an LF radio wave receiver 121, an RF radio wave transmitter 122, a communication device 123, and a key ECU 124.

The key unit 12 may be arranged at a position that is not visible from a user seated on each seat of the vehicle 10 (for example, inside the glove box or the center console box). In addition, the key unit 12 may or may not be fixed in the vehicle 10. Furthermore, the key unit 12 may be operated on the built-in button cell batteries or may be operated on electric power supplied from an auxiliary battery mounted on the vehicle 10.

The LF radio wave receiver 121 receives LF radio waves under the control of the key ECU 124 (LF reception processing unit 1241 that will be described later).

The RF radio wave transmitter 122 sends RF radio waves under the control of the key ECU 124 (RF sending processing unit 1242 that will be described later).

The communication device 123 is an arbitrary device that communicates with the portable terminal 20 at a relatively short distance (a distance short enough for communication between the vehicle interior and the vehicle exterior) in conformity with a predetermined communication standard under the control of the key ECU 124. For example, the communication device 123 may be a Bluetooth (registered trademark) Low Energy (BLE) communication module that communicates with the portable terminal 20 in conformity with the BLE communication standard. The description will be continued below on the premise that the communication standard adopted in the communication device 123 conforms to the BLE communication.

The communication device 123 may also be a communication device conforming to a short-range communication standard (for example, Near Field Communication (NFC) standard) having a very short communicable distance. In this case, the communication device 123 may be built in a position close to the body surface outside the vehicle interior of the vehicle 10 (for example, inside the door handle). This allows the key unit 12 (the key ECU 124) to communicate with the portable terminal 20 in the vehicle exterior even when the communicable distance of the communication device 123 is very short.

The key ECU 124 is an electronic control unit that controls the transmission of the lock signal and the unlock signal to the locking/unlocking device 11 in response to each of the lock request and the unlock request received from the portable terminal 20. The key ECU 124, which is for example configured mainly by a microcomputer, executes various programs, stored in the ROM, on the CPU for implementing various control processing. The key ECU 124 includes an LF reception processing unit 1241, an RF sending processing unit 1242, a communication processing unit 1243, and an authentication processing unit 1244 each as a functional unit implemented by executing one or more programs. In addition, the key ECU 124 includes a storage unit 1245 implemented, for example, as a storage area of the internal memory.

The LF reception processing unit 1241 receives LF radio waves through the LF radio wave receiver 121. For example, the LF reception processing unit 1241 receives LF radio waves sent from the locking/unlocking device 11.

The RF sending processing unit 1242 sends RF radio waves through the RF radio wave transmitter 122. For example, when the authentication by the authentication processing unit 1244 is successful, the RF sending processing unit 1242 sends the lock signal (when the communication processing unit 1243 receives the lock request) or the unlock signal (when the communication processing unit 1243 receives the unlock request) each of which includes the key information 1245b that will be described later.

The communication processing unit 1243 communicates with the portable terminal 20 through the communication device 123. For example, the communication processing unit 1243 receives the lock request and the unlock request from the portable terminal 20 through the communication device 123. In addition, when the lock signal is sent from the RF sending processing unit 1242 to the locking/unlocking device 11 in response to the lock request from the portable terminal 20, the communication processing unit 1243 sends the notification (lock notification), which indicates that the vehicle 10 has been locked, to the portable terminal 20 in response to the request from the authentication processing unit 1244. This notification allows the portable terminal 20 to know that the vehicle 10 has been locked.

When the communication processing unit 1243 receives the lock request or the unlock request from the portable terminal 20, the authentication processing unit 1244 performs authentication based on the BLE authentication information (an example of the first authentication information) associated with the key unit 12. The BLE authentication information is included in the lock request or the unlock request and is uniquely set for the key unit 12 in advance. More specifically, the authentication processing unit 1244 determines that the authentication is successful if the BLE authentication information 1245a, registered in advance in the storage unit 1245, and the BLE authentication information, included in the lock request or the unlock request, match, and determines that the authentication is not successful if they do not match.

In addition, if the authentication corresponding to the unlock request received by the communication processing unit 1243 is successful, the authentication processing unit 1244 turns on the power of the key unit 12. After that, the authentication processing unit 1244 sends the sending request to the RF sending processing unit 1242 to send the unlock signal to the locking/unlocking device 11.

In addition, if the authentication corresponding to the lock request received by the communication processing unit 1243 is successful, the authentication processing unit 1244 sends the sending request to the RF sending processing unit 1242 to send the lock signal to the locking/unlocking device 11 and, after that, sends the sending request to the communication processing unit 1243 to send the lock notification to the portable terminal 20. After that, authentication processing unit 1244 turns off the power of the key unit 12.

Even when the power of the key unit 12 is OFF, the functions of the units that consume a very small amount of power, such as the communication processing unit 1243 and the authentication processing unit 1244, are still available for use. When the power of the key unit 12 is switched from OFF to ON, the units that consume a large amount of power, such as the LF radio wave receiver 121 and the RF radio wave transmitter 122, become available for use.

In addition, if the authentication is successful, the authentication processing unit 1244 restores the key information 1245b, stored in the storage unit 1245, to the usable state. For example, the key information 1245b, which is in the inaccessible state or the encrypted state, is stored in the state not usable for the authentication by the locking/unlocking device 11. Therefore, if the authentication is successful, the authentication processing unit 1244 changes the access right for accessing the storage unit 1245 so that the key information 1245b becomes accessible or decrypts the encrypted key information 1245b based on the BLE authentication information. This processing allows the RF sending processing unit 1242 to access the key information 1245b, which is not usually accessible, and then send the lock signal and the unlock signal, each of which includes the key information 1245b, to the locking/unlocking device 11, or to send the lock signal and the unlock signal, each of which includes the decrypted key information 1245b, to the locking/unlocking device 11. Therefore, the locking/unlocking device 11 (more specifically, the authentication processing unit 1133) can perform authentication appropriately based on the key information 1245b included in the lock signal and unlock signal. In addition, even if a malicious third party illegally obtains the key unit 12, the theft of the vehicle 10 can be prevented because the key information 1245b in the key unit 12 is not accessible or is encrypted.

The portable terminal 20 is, for example, a smartphone, a tablet terminal, or the like. The portable terminal 20 can bi-directionally communicate with the center server 30 and the third party server 50 through a predetermined communication network (for example, a mobile phone network with many base stations as its terminals, the Internet, etc.). The portable terminal 20 includes communication devices 21 and 22, a processing device 23, and a touch panel display (hereinafter simply referred to as a display) 24.

The communication device 21 is an arbitrary device that communicates with the key unit 12 according to the same communication standard as that of the communication device 123. For example, the communication device 21 is a BLE communication module.

The communication device 22 is an arbitrary device that communicates with the center server 30 and the third party server 50 through a predetermined communication network.

The processing device 23, which includes a CPU, an auxiliary storage device, and the like, includes a first communication processing unit 231, a second communication processing unit 232, a locking/unlocking request unit 233, a third party application unit 234, and an authentication information erasing unit 235 each as a functional unit implemented by executing one or more programs on the CPU. In addition, the processing device 23 includes a storage unit 236 implemented as a storage area in the auxiliary storage device.

The first communication processing unit 231 uses the communication device 21 to wirelessly communicate with the key unit 12 for sending and receiving various signals. For example, the first communication processing unit 231 sends the lock signal and the unlock signal to the key unit 12 in response to a request from the locking/unlocking request unit 233.

The second communication processing unit 232 (an example of the first receiving unit) uses the communication device 22 to wirelessly communicate with a base station for sending and receiving various signals such as data signals and control signals. In this embodiment, the second communication processing unit 232 sends and receives various signals to and from the center server 30 and the third party server 50 through a mobile phone network with base stations as its terminals and the Internet. For example, in response to a request from the locking/unlocking request unit 233, the second communication processing unit 232 sends the signal that requests the BLE authentication information to the center server 30 and, at the same time, receives the signal that includes the BLE authentication information sent from the center server 30. The BLE authentication information received from the second communication processing unit 232 is stored in the storage unit 236. In addition, in response to a request from the locking/unlocking request unit 233, the second communication processing unit 232 sends the signal that requests permission to use the vehicle 10 to the center server 30 and, at the same time, receives the signal that indicates permission to use the vehicle 10 from the center server 30. The "use of vehicle 10" includes an operation to unlock the vehicle 10, to get in the vehicle 10, to turn on the ignition switch of the vehicle 10, and to drive the vehicle 10 for traveling. In addition, in response to a request from the third party application unit 234, the second communication processing unit 232 sends the signal that requests the disclosure of schedule information on the vehicle 10 to the third party server 50 and, at the same time, receives the schedule information on the vehicle 10 from the third party server 50 as the reference data. In addition, in response to a request from the third party application unit 234, the second communication processing unit 232 sends various requests for making the use reservation of the vehicle 10, and requests for the settlement processing for the use of the vehicle 10, to the third party server 50.

The locking/unlocking request unit 233 (an example of the third sending unit) sends the lock request (third signal) that includes the BLE authentication information, or the unlock request (third signal) that includes the BLE authentication information, to the key unit 12 via the first communication processing unit 231 in response to a predetermined operation (second operation) on the Graphical User Interface (GUI) displayed on the display 24 as an operation screen. For example, the Lock button for requesting the locking of the vehicle 10, and the Unlock button for requesting the unlocking of the vehicle 10, are drawn on the GUI on the display 24. The lock request is sent by touching the Lock button, and the unlock request is sent by touching the Unlock button.

The operation for sending the lock request and the unlock request to the key unit 12 may be an operation on a hardware operation unit provided on the portable terminal 20, instead of the touch operation on the display 24. In addition, if the BLE authentication information is not stored in the storage unit 236 (that is, if the BLE authentication information is not yet received from the center server 30, or if the BLE authentication information is already erased by the authentication information erasing unit 235), the BLE authentication information is not included in the lock signal and unlock signal. Therefore, even if the lock signal or the unlock signal not including the BLE authentication information is sent to the key unit 12, the door of the vehicle 10 cannot be locked and unlocked. In addition, if the BLE authentication information is not stored in the storage unit 236, it is also possible not to send the lock signal or the unlock signal.

In addition, in response to a predetermined operation (first operation) on the GUI, the locking/unlocking request unit 233 (an example of the first sending unit) sends the signal that requests the BLE authentication information (authentication information request signal) to the center server 30 via the second communication processing unit 232. For example, the input fields for entering the user's identification information, password, and use date and time of the vehicle 10 for use reservation, and the Send button are drawn on the GUI of the display 24. The authentication information request signal (first signal) is sent to the center server 30 by entering the necessary items and then touching the Send button.

The information on the use reservation date and time of the vehicle 10 that is reserved for use may be automatically entered based on the use reservation function of the third party application unit 234 provided for reserving the use of the vehicle 10.

In addition, at the start of using the vehicle 10 (before unlocking the vehicle 10 for the first time), the locking/unlocking request unit 233 sends the signal that includes the position information on the portable terminal 20, and that requests permission to use the vehicle 10, to the center server 30 via the second communication processing unit 232 in response to a predetermined operation (third operation) by the user on the GUI. This allows a vehicle use management unit 322 of the center server 30 to receive the signal and, based on the position information on the portable terminal 20 included in the signal, to confirm that the user has arrived at the parking position of the vehicle 10. After that, the vehicle use management unit 322 confirms that the current date and time is immediately before the use start date and time of the vehicle 10 or within the use reservation date and time and, then, sends the use permission signal to the portable terminal 20.

If it is determined that the user has arrived at the parking position of the vehicle 10 and that the current date and time is immediately before the use start date and time of the vehicle 10 or within the use reservation date and time, the locking/unlocking request unit 233 may automatically send the signal that requests permission to use the vehicle 10 to the center server 30. In addition, the portable terminal 20, which has the GPS positioning function and the base station positioning function both of which are known, can acquire the position information on the portable terminal 20 using these positioning functions.

In this embodiment, the function of the locking/unlocking request unit 233 is incorporated in the third party application unit 234, for example, in the form of a Software Development Kit (SDK) that will be described later. Therefore, the GUI for realizing the function of the locking/unlocking request unit 233 is displayed on the display 24 by the third party application unit 234. When this GUI is displayed and any of the above-described predetermined operations (the first operation, the second operation, and the third operation) is performed on the GUI, the locking/unlocking request unit 233 is called from the third party application unit 234 to realize each function of the locking/unlocking request unit 233 described above. That is, when a user's predetermined operation (first operation) is performed on the GUI during execution of the third party application unit 234, the locking/unlocking request unit 233 sends the authentication information request signal to the center server 30 in response to a call from the third party application unit 234. In addition, when a user's predetermined operation (second operation) is performed on the GUI during execution of the third party application unit 234, the locking/unlocking request unit 233 sends a lock request or an unlock request to the key unit 12 in response to a call from the third party application unit 234. Also, when a user's predetermined operation (third operation) is performed on the GUI during execution of the third party application unit 234, the locking/unlocking request unit 233 sends the signal that requests permission to use the vehicle 10 to the center server 30 in response to a call from the third party application unit 234.

The third party application unit 234 (an example of the service providing unit) is a functional unit realized by executing a predetermined application program (third party application program) installed in the portable terminal 20. The third party application unit 234 communicates with the third party server 50 through the second communication processing unit 232 to provide a predetermined service different from the locking/unlocking function of the vehicle 10 (for example, use reservation service for the vehicle 10 in car sharing, settlement service in car sharing etc.). For example, the third party application unit 234 causes the display 24 to display the GUI as the operation screen and, in response to a user's predetermined operation on the GUI, carries out two-way communication with the third party server to make a use reservation for the vehicle 10. In addition, in response to a user's predetermined operation on the GUI, the third party application unit 234 carries out two-way communication with the third party server 50 to perform the settlement processing for using the vehicle 10.

The third party application unit 234 may be replaced by a similar functional unit implemented by a program provided, not by a third party, that is, a third party different from the user's own organization providing the programs for implementing the locking/unlocking request unit 233 and for managing the center server 30, but by the user's own organization. In such a case, the third party server 50 is replaced by a service provision server managed by the user's own organization.

The authentication information erasing unit 235 erases the BLE authentication information, received from the center server 30 via the second communication processing unit 232, from the storage unit 236. For example, when the use end date and time of the vehicle 10 has elapsed, the authentication information erasing unit 235 erases the BLE authentication information. This prevents the user of the portable terminal 20 from being able to use the vehicle 10 on a date/time other than the use reservation date/time.

The authentication information erasing unit 235 can confirm the use end date and time of the vehicle 10 based on the use expiration information that is sent with the BLE authentication information from the center server 30.

The center server 30 manages the use status of the vehicle 10. The center server 30 includes a communication device 31 and a management device 32.

The communication device 31 is an arbitrary device that communicates with the portable terminal 20 and the third party server 50 through a predetermined communication network.

The management device 32, configured mainly by one or more computers, includes a communication processing unit 321 and the vehicle use management unit 322, each as a functional unit implemented by executing one or more programs on the CPU. In addition, the management device 32 includes a user information DB 324 and an authentication information DB 325 both of which are stored in the internal auxiliary storage device.

The communication processing unit 321 (an example of the second receiving unit) uses the communication device 31 to send and receive various signals to and from the portable terminal 20. For example, the communication processing unit 321 receives the signal that requests the BLE authentication information (authentication information request signal) from the portable terminal 20 and, in response to a request from the vehicle use management unit 322 corresponding to that signal, sends the signal that includes the BLE authentication information to the portable terminal 20. In addition, the communication processing unit 321 receives the signal that requests permission to use the vehicle 10 from the portable terminal 20 and, in response to a request from the vehicle use management unit 322 corresponding to that signal, sends the use permission signal for the vehicle 10 to the portable terminal 20.

The vehicle use management unit 322 (an example of the second sending unit) sends the BLE authentication information to the portable terminal 20 via the communication processing unit 321 in response to the authentication information request signal that the communication processing unit 321 receives from the portable terminal 20. For example, the vehicle use management unit 322 verifies whether the user's identification information and password, included in the authentication information request signal, match the user's identification information and password registered in advance in the user information DB 324. If they match, the vehicle use management unit 322 determines that user is an authorized user and retrieves the BLE authentication information, corresponding to the key unit 12 mounted on the vehicle 10, from the authentication information DB 325. In addition, the vehicle use management unit 322 extracts the use end date and time based on the information on the use reservation date and time of the vehicle 10 included in the authentication information request signal. Then, the vehicle use management unit 322 sends the signal that includes the BLE authentication information, as well as the use expiration information (use end date and time of the vehicle 10) on the BLE authentication information, to the portable terminal 20 via the communication processing unit 321.

The user information DB 324 stores the identification information and the corresponding password on the users registered in advance for using the vehicle 10.

The authentication information DB 325 stores the BLE authentication information associated with the identification information unique to the key unit 12.

Next, with reference to FIG. 3, the outline of the operation of the locking/unlocking system 1 according to this embodiment will be described.

Figure 3:
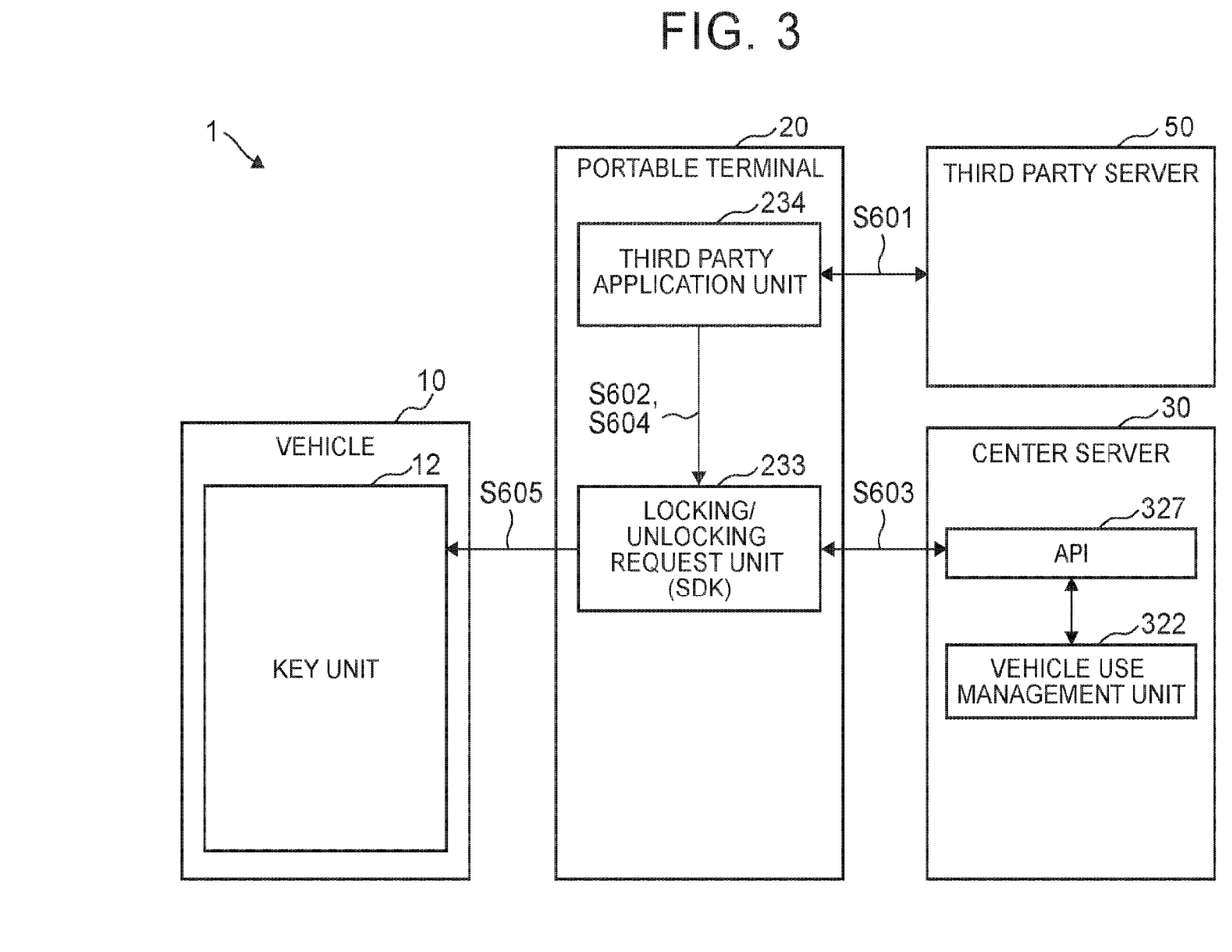
FIG. 3 is a conceptual diagram conceptually showing an operation of the locking/unlocking system.

In FIG. 3, in order to conceptually describe the exchange of signals among the main components, the hardware (communication devices 21, 22, and 31) and the software (first communication processing unit 231, second communication processing unit 232, and communication processing units 321) for implementing the communication function are omitted.

In step S601, in response to a user's predetermined operation on the GUI displayed on the display 24, the third party application unit 234 carries out two-way communication with the third party server 50 to make a use reservation for the vehicle 10.

In step S602, when a predetermined operation (first operation) is performed on the GUI, the third party application unit 234 calls the locking/unlocking request unit 233 that is installed in the portable terminal 20 in the form it is incorporated in the third party application unit 234 as an SDK.

In step S603, the SDK (the locking/unlocking request unit 233) sends the signal that requests the BLE authentication information (authentication information request signal) to the vehicle use management unit 322 using an Application Programming Interface (API) 327 that calls the vehicle use management unit 322. As a result, the vehicle use management unit 322 is called. The vehicle use management unit 322 verifies whether the user's identification information and password, included in the authentication information request signal, match the identification information and password registered in advance in the user information DB 324. If they match, the vehicle use management unit 322 retrieves the BLE authentication information, corresponding to the key unit 12 arranged inside the vehicle 10, from the authentication information DB 325 and sends the retrieved BLE authentication information to the SDK (locking/unlocking request unit 233) using the API 327. In this way, the BLE authentication information is stored in the storage unit 236.

Note that, even when the locking/unlocking request unit 233 provided as an SDK is called, the execution of the third party application unit 234 is continued on the portable terminal 20 with the GUI displayed on the display 24 by the third party application unit 234.

In step S604, when a user's predetermined operation (second operation) is performed on the GUI, the third party application unit 234 calls the SDK (the locking/unlocking request unit 233).

In step S605, the SDK (the locking/unlocking request unit 233) sends a lock request or an unlock request that includes the BLE authentication information to the key unit 12. As a result, without leaving the GUI displayed by the third party application unit 234, the user can operate the locking/unlocking device 11 via the key unit 12 as described above for locking or unlocking the vehicle 10.

Figure 4:
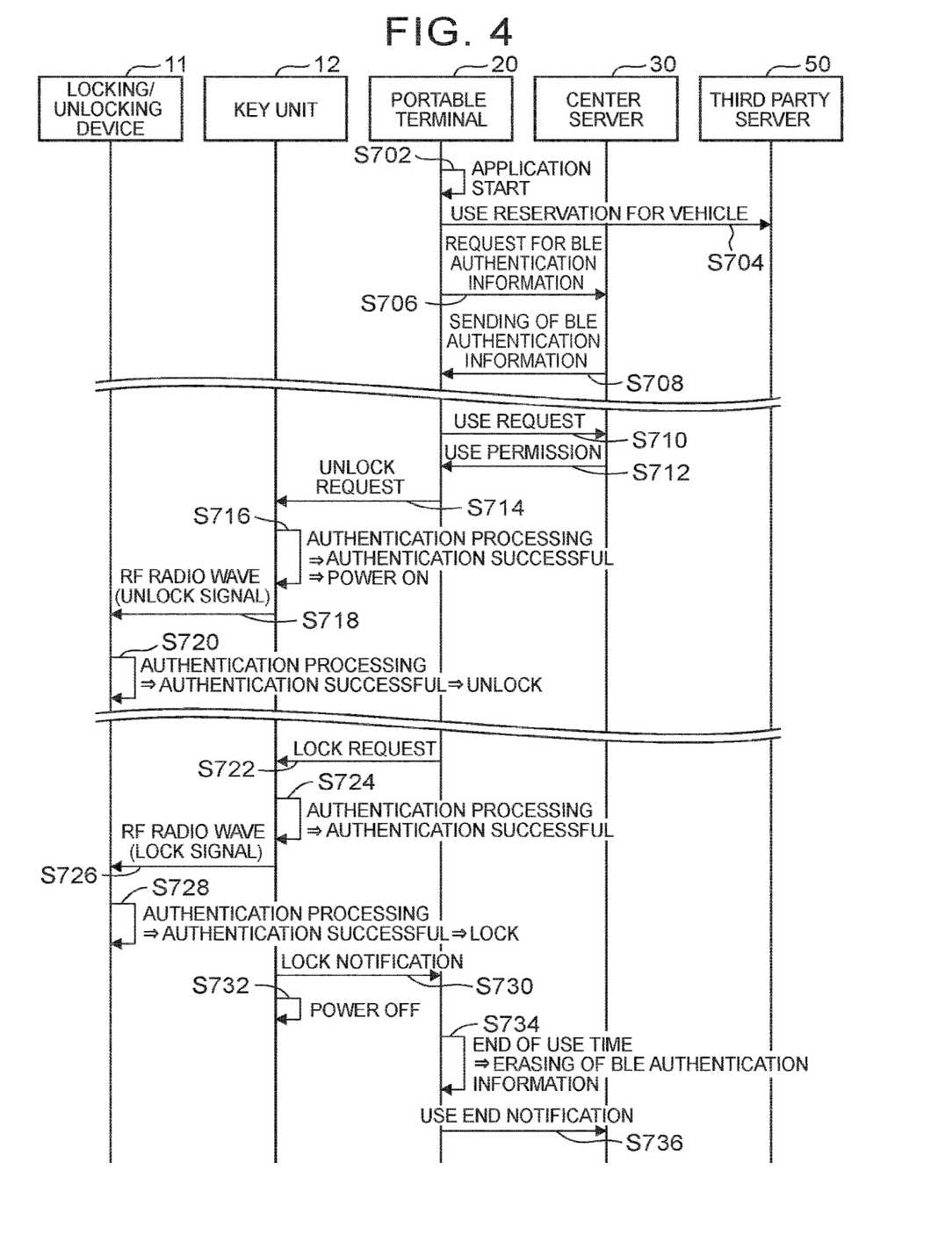
FIG. 4 is a sequence diagram showing an example of an operation of the locking/unlocking system.

Next, a specific example of the operation of the locking/unlocking system 1 in this embodiment will be described with reference to FIG. 4.

Steps S702 to S708 represent a series of operations from the time a use reservation for the vehicle 10 is made to the time the BLE authentication information is sent to the portable terminal 20.

In step S702, the third party application unit 234 of the portable terminal 20 is started in response to a user's predetermined operation (for example, a touch operation on the icon of the third party application displayed on the display 24).

In step S704, in response to a predetermined operation on the GUI displayed on the display 24, the third party application unit 234 of the portable terminal 20 performs two-way communication with the third party server 50 to make a use reservation for the vehicle 10.

In step S706, the third party application unit 234 of the portable terminal 20 calls the locking/unlocking request unit 233 in response to a predetermined operation (first operation) on the GUI displayed on the display 24. Then, the called locking/unlocking request unit 233 sends the signal that requests the BLE authentication information (authentication information request signal) to the center server 30. As a result, the center server 30 receives the authentication information request signal.

In step S708, the third party application unit 234 of the center server 30 authenticates the user based on the user's identification information and password included in the authentication information request signal and, then, sends the BLE authentication information, corresponding to the key unit 12 arranged inside the vehicle 10, to the portable terminal 20.

The vehicle use management unit 322 may send the BLE authentication information to the portable terminal 20 immediately before (for example, 10 minutes before) the use start date and time of the vehicle 10. This reduces the possibility that the user will unlock the vehicle 10 and use the vehicle 10 before the use start date and time of the vehicle 10.

Next, steps S710 to S720 represent a series of operations at the start of the use of the vehicle 10.

In step S710, in response to a user's predetermined operation on the GUI displayed on the display 24, the locking/unlocking request unit 233 of the portable terminal 20 sends the signal that requests permission to use the vehicle 10 to the center server 30 via the processing unit 232.

In step S712, the vehicle use management unit 322 of the center server 30 sends the use permission signal to the portable terminal 20 via the communication processing unit 321. As a result, the locking/unlocking request unit 233 of the portable terminal 20 receives the use permission signal via the second communication processing unit 232.

Note that the processing flow may be modified as follows. That is, the BLE authentication information, received by the portable terminal 20 during the processing of step S708, is encrypted, and the encrypted BLE authentication information is decrypted using the use permission signal received by the portable terminal 20 during the processing of step S712. This decryption processing with the use of the use permission signal prevents the user from unlocking the vehicle 10 for using the vehicle 10 before the use start date and time of the vehicle 10.

In step S714, the locking/unlocking request unit 233 of the portable terminal 20, which is called from the third party application unit 234 in response to a user's predetermined operation on the GUI displayed on the display 24, sends the unlock request, which includes the BLE authentication information, to the key unit 12. As a result, the communication processing unit 1243 of the key unit 12 receives the unlock request.

In step S716, the authentication processing unit 1244 of the key unit 12 performs authentication based on the BLE authentication information included in the unlock request and, if the authentication is successful, turns on the power of the key unit 12.

In step S718, the authentication processing unit 1244 of the key unit 12 sends a sending request to the RF sending processing unit 1242 and, in response to the sending request, the RF sending processing unit 1242 sends the unlock signal that includes the restored key information to the locking/unlocking device 11. As a result, the RF reception processing unit 1132 of the locking/unlocking device 11 receives the unlock signal.

In step S720, the authentication processing unit 1133 of the locking/unlocking device 11 performs authentication based on the key information included in the unlock signal. If the authentication is successful, the locking/unlocking control unit 1134 drives the door locking motor 115 via the body ECU 114 to unlock the door of the vehicle 10. Then, the user of the portable terminal 20 can get in and use the vehicle 10.

Next, steps S722 to S736 represent a series of operations at the end of the use of the vehicle 10.

In step S722, the locking/unlocking request unit 233 of the portable terminal 20, which is called from the third party application unit 234 in response to a user's predetermined operation on the GUI displayed on the display 24, sends a lock request, which includes the BLE authentication information, to the key unit 12. As a result, the communication processing unit 1243 of the key unit 12 receives the lock request.

In step S724, the authentication processing unit 1244 of the key unit 12 performs authentication based on the BLE authentication information included in the lock request.

In step S726, if the authentication is successful, the authentication processing unit 1244 of the key unit 12 sends a sending request to the RF sending processing unit 1242 and, in response to the transmission request, the RF sending processing unit 1242 sends the lock signal that includes the restored key information to the locking/unlocking device 11. As a result, the RF reception processing unit 1132 of the locking/unlocking device 11 receives the lock signal.

In step S728, the authentication processing unit 1133 of the locking/unlocking device 11 performs authentication based on the key information included in the lock signal. If the authentication is successful, the locking/unlocking control unit 1134 drives the door locking motor 115 via the body ECU 114 to lock the door of the vehicle 10.

On the other hand, after sending the lock signal to the locking/unlocking device 11 via the RF sending processing unit 1242, the authentication processing unit 1244 of the key unit 12 sends a sending request to the communication processing unit 1243 in step S730 and, in response to the sending request, the communication processing unit 1243 sends a lock notification to the portable terminal 20.

Then, after sending the lock notification to the portable terminal 20 via the communication processing unit 1243, the authentication processing unit 1244 of the key unit 12 turns off the power of the key unit 12 in step S732.

In step S734, the authentication information erasing unit 235 of the portable terminal 20 deletes the BLE authentication information from the storage unit 236 when the use end date and time has elapsed.

In step S736, the authentication information erasing unit 235 of the portable terminal 20 sends a sending request to the second communication processing unit 232. In response to the sending request, the second communication processing unit 232 sends a use end notification to the center server 30.

As described above, in this embodiment, the third party application unit 234 communicates with the third party server 50, different from the center server 30, to provide a predetermined service (use reservation service of the vehicle 10). When a predetermined operation (first operation) is performed on the GUI displayed on the display 24 during execution of the third party application unit 234, the locking/unlocking request unit 233 is called from the third party application unit 234 to send the authentication information request signal to the center server 30 via the second communication processing unit 232. Similarly, the locking/unlocking request unit 233 is called from the third party application unit 234 during execution of the third party application unit 234 to receive the BLE authentication information from the center server 30 via the second communication processing unit 232. In addition, when a predetermined operation (second operation) is performed on the GUI displayed on the display 24 during execution of the third party application unit 234, the locking/unlocking request unit 233 is called from the third party application unit 234 to send the lock request (third signal) or the unlock request (third signal), which includes the BLE authentication information received from the center server 30, to the vehicle 10 (key unit 12) via the first communication processing unit 231. Therefore, for example, when there is already a third party that provides services such as the use reservation service and the settlement service used in car sharing, the locking/unlocking system in this embodiment can realize car sharing while specializing in providing the function for locking and unlocking the vehicle 10 using the portable terminal 20, thus reducing the cost and the initial investment. In addition, the system in this embodiment, which can attract a user who uses a third-party application, makes it easier for the user to start business quickly, for example, when the user wants to start the car-sharing business. In addition, since the portable terminal 20 is configured to acquire the first authentication information, not from the third party server 50, but from the center server 30 of the user's own organization, the first authentication information can be provided to the portable terminal 20 without disclosing the first authentication information to a third party. Furthermore, in some cases, it is unnecessary to strictly manage the use reservation, for example, when vehicles are lent and borrowed between users using a communication application. Therefore, by installing the locking/unlocking request unit 233 in the portable terminal 20 in the form it is incorporated in a communication application so that the BLE authentication information can be acquired from the center server 30, the user can lend and borrow vehicles freely without exchanging electronic keys.

In this embodiment, the portable terminal 20 (locking/unlocking request unit 233) requests the center server 30, different from the third party server 50 to which the third party application unit 234 is connected, to send the BLE authentication information in response to a call from the third party application unit 234 that is an existing application. After that, the portable terminal 20 (the second communication processing unit 232) receives the BLE authentication information from the center server 30. Therefore, since the BLE authentication information is stored in the center server 30 different from the third party server 50 to which an existing application connected and is managed according to a dedicated security policy, the leakage of the BLE authentication information to the outside world can be reduced. In addition, when the BLE authentication information is sent to the portable terminal 20 in response to the authentication information request signal from the portable terminal 20, the center server 30 authenticates the user based on the identification information on the user of the portable terminal 20 included in the authentication information request signal. Therefore, even when an access is made to the center server 30 via a third party application, security can be maintained.

Although the mode for carrying out the present disclosure has been described in detail above, the present disclosure is not limited to such specific embodiments but various modifications and changes are possible.

For example, though a lock request and an unlock request, which are sent from the portable terminal 20 to the vehicle 10, are sent to the key unit 12 in the embodiment described above, those requests may be sent directly to the locking/unlocking device 11. That is, the system may be configured in such a way that the portable terminal 20 receives the key information, instead of the BLE authentication information, from the center server 30 and sends an unlock request or a lock request that includes the key information to the locking/unlocking device 11 and that, in response to the unlock request or lock request, the locking/unlocking device 11 performs authentication and lock or unlock the vehicle 10.

In addition, though the subject of locking/unlocking and use reservation is a vehicle in the above-described embodiments, the present disclosure is not limited to a vehicle if the subject is available to a plurality of users in different time zones and can be locked/unlocked. In other words, the vehicle that is the subject of locking/unlocking and use reservation in the above-described embodiments may be replaced with facilities capable of being locked and unlocked such as a conference room, a recreation center, a gymnasium, and the like. As a result, the convenience of the users who will use the facilities is improved as in the above-described embodiments.

What is claimed is:

1. A locking and unlocking system comprising:
    a portable terminal;
    a first server configured to communicate with the portable terminal and store authentication information for locking or unlocking a vehicle or facilities in accordance with a use reservation of the vehicle or the facilities; and
    a second server, different from the first server, configured to communicate with the portable terminal and manage use reservation information of the use reservation of the vehicle or the facilities, wherein
    the portable terminal includes:
        a service providing unit configured to provide a use reservation service for making the use reservation of the vehicle or the facilities by communicating with the second server without going through the first server;
        a first sending unit configured to send a first signal to the first server in response to a request from the service providing unit; and
        a first receiving unit configured to receive the authentication information from the first server,
    the first server includes:
        a second receiving unit configured to receive the first signal from the portable terminal; and
        a second sending unit configured to send a second signal to the portable terminal when the second receiving unit receives the first signal, the second signal including the authentication information,
    the first server that stores the authentication information for locking or unlocking the vehicle or the facilities in accordance with the use reservation of the vehicle or the facilities is administered by another organization different from an organization that administers the second server that manages the use reservation information of the use reservation of the vehicle or the facilities,
    the use reservation service is executed by an application program installed in the portable terminal, the application program being administered by the organization that administers the second server that manages the use reservation information of the use reservation of the vehicle or the facilities and that is different from the organization that administers the first server that stores the authentication information for locking or unlocking the vehicle or the facilities in accordance with the use reservation of the vehicle or the facilities, and
    the first sending unit is configured to send the first signal to the first server when a user performs an operation on the portable terminal during execution of the application program that is administered by the second server.

2. The locking and unlocking system according to claim 1, wherein the portable terminal further includes:
    a third sending unit configured to send a third signal to a predetermined device provided in the vehicle or the facilities in response to a request from the service providing unit, the third signal including the authentication information and requesting locking or unlocking of the vehicle or the facilities.

3. The locking and unlocking system according to claim 1, wherein the first sending unit is configured to send the first signal to the first server when the user performs an input operation on the portable terminal to cause the portable terminal to send information including the use reservation for the vehicle or the facilities during execution of the application program.

4. The locking and unlocking system according to claim 2, wherein the third sending unit is configured to send the third signal to the predetermined device when an operation to lock or unlock the vehicle or the facilities is performed on the portable terminal.

5. The locking and unlocking system according to claim 1, wherein the first signal includes a request for the authentication information.

6. A portable terminal configured to communicate with a first server configured to communicate with the portable terminal and store authentication information for locking or unlocking a vehicle or facilities in accordance with a use reservation of the vehicle or the facilities and a second server, different from the first server, configured to communicate with portable terminal and manage use reservation information of the use reservation of the vehicle or the facilities, the portable terminal comprising:
    a service providing unit configured to provide a use reservation service for making the use reservation of the vehicle or the facilities by communicating with the second server without going through the first server;
    a first sending unit configured to send a first signal to the first server in response to a request from the service providing unit; and a first receiving unit configured to receive the authentication information from the first server, wherein the first server that stores the authentication information for locking or unlocking the vehicle or the facilities in accordance with the use reservation of the vehicle or the facilities is administered by another organization different from an organization that administers the second server that manages the use reservation information of the use reservation of the vehicle or the facilities, the use reservation service is executed by an application program installed in the portable terminal, the application program being administered by the organization that administers the second server that manages the use reservation information of the use reservation of the vehicle or the facilities and that is different from the organization that administers the first server that stores the authentication information for locking or unlocking the vehicle or the facilities in accordance with the use reservation of the vehicle or the facilities, and the first sending unit is configured to send the first signal to the first server when a user performs an operation on the portable terminal during execution of the application program that is administered by the second server.

7. The portable terminal according to claim 6, further comprising:

a second sending unit configured to send a second signal to a predetermined device provided in the vehicle or the facilities in response to a request from the service providing unit, the second signal including the authentication information and requesting locking or unlocking of the vehicle or the facilities.

8. The portable terminal according to claim 6, wherein the first sending unit is configured to send the first signal to the first server when the user performs an input operation on the portable terminal to cause the portable terminal to send information including the use reservation for the vehicle or the facilities during execution of the application program.

9. The portable terminal according to claim 7, wherein the second sending unit is configured to send the second signal to the predetermined device when an operation to lock or unlock the vehicle or the facilities is performed on the portable terminal.

10. The locking and unlocking method executed by the portable terminal according to claim 9, wherein the first signal is sent to the first server by the first sending unit when the user performs an input operation on the portable terminal to cause the portable terminal to send information including the use reservation for the vehicle or the facilities during execution of the application program.

11. The portable terminal according to claim 6, wherein the first signal includes a request for the authentication information.

12. A locking and unlocking method executed by a portable terminal, the portable terminal including a service providing unit, a first sending unit, and a first receiving unit, the portable terminal configured to communicate with a first server configured to communicate with the portable terminal and store authentication information for locking or unlocking a vehicle or facilities in accordance with a use reservation of the vehicle or the facilities and a second server, different from the first server, configured to communicate with portable terminal and manage use reservation information of the use reservation of the vehicle or the facilities, the locking and unlocking method executed by the portable terminal comprising:

providing, by the service providing unit, a use reservation service for making the use reservation of the vehicle or the facilities by communicating with the second server without going through the first server;

sending, by the first sending unit, a first signal to the first server in response to a request from the service providing unit; and receiving, by the first receiving unit, the authentication information from the first server, wherein the first server that stores the authentication information for locking or unlocking the vehicle or the facilities in accordance with the use reservation of the vehicle or the facilities is administered by another organization different from an organization that administers the second server that manages the use reservation information of the use reservation of the vehicle or the facilities, the use reservation service is executed by an application program installed in the portable terminal, the application program being administered by the organization that administers the second server that manages the use reservation information of the use reservation of the vehicle or the facilities and that is different from the organization that administers the first server that stores the authentication information for locking or unlocking the vehicle or the facilities in accordance with the use reservation of the vehicle or the facilities, and the first signal is sent to the first server by the first sending unit when a user performs an operation on the portable terminal during execution of the application program that is administered by the second server.

13. The locking and unlocking method executed by the portable terminal according to claim 12, wherein the portable terminal further comprises a second sending unit, and the method further comprises:

sending, by the second sending unit, a second signal to a predetermined device provided in the vehicle or the facilities in response to a request from the service providing unit, the second signal including the authentication information and requesting locking or unlocking of the vehicle or the facilities.

14. The locking and unlocking method executed by the portable terminal according to claim 13, wherein the sending the second signal to the predetermined device includes:

sending the second signal to the predetermined device when an operation to lock or unlock the vehicle or the facilities is performed on the portable terminal.

15. The locking and unlocking method executed by the portable terminal according to claim 12, wherein the first signal includes a request for the authentication information.

16. A non-transitory storage medium storing a program, the program being installed in a portable terminal configured to communicate with a first server configured to communicate with the portable terminal and store authentication information for locking or unlocking a vehicle or facilities in accordance with a use reservation of the vehicle or the facilities and a second server, different from the first server, configured to communicate with portable terminal and manage use reservation information of the use reservation of the vehicle or the facilities, wherein the program is configured to cause the portable terminal to:

provide the a reservation service for making the use reservation of the vehicle or the facilities by communicating with the second server without going through the first server;

send a first signal to the first server; and receive the authentication information from the first sever, the first server that stores the authentication information for locking or unlocking the vehicle or the facilities in accordance with the use reservation of the vehicle or the facilities is administered by another organization different from an organization that administers the second server that manages the use reservation information of the use reservation of the vehicle or the facilities, the use reservation service is executed by an application program installed in the portable terminal, the application program being administered by the organization that administers the second server that manages the use reservation information of the use reservation of the vehicle or the facilities and that is different from the organization that administers the first server that stores the authentication information for locking or unlocking the vehicle or the facilities in accordance with the use reservation of the vehicle or the facilities, and the first signal is sent to the first server when a user performs an operation on the portable terminal during execution of the application program that is administered by the second server.

17. The non-transitory storage medium according to claim 16, wherein the first signal includes a request for the authentication information.

18. A first server configured to communicate with a portable terminal and store authentication information for locking or unlocking a vehicle or facilities in accordance with a use reservation of the vehicle or the facilities, the first server comprising:

a second receiving unit; and a second sending unit, wherein the portable terminal includes:

a service providing unit configured to provide a use reservation service for making the use reservation of the vehicle or the facilities by communicating with a second server, different from the first server, configured to communicate with portable terminal and manage use reservation information of the use reservation of the vehicle or the facilities, the first server that stores the authentication information for locking or unlocking the vehicle or the facilities in accordance with the use reservation of the vehicle or the facilities being administered by another organization different from an organization that administers the second server that manages the use reservation information of the use reservation of the vehicle or the facilities, a first sending unit configured to send, to the first server, a first signal requesting the authentication information, and a first receiving unit configured to receive the authentication information from the first server;

the second receiving unit is configured to receive the first signal from the portable terminal;

the second sending unit is configured to send, to the portable terminal, a second signal including the authentication information when the second receiving unit receives the first signal, the use reservation service is executed by an application program installed in the portable terminal, the application program being administered by the organization that administers the second server that manages the use reservation information of the use reservation of the vehicle or the facilities and that is different from the organization that administers the first server that stores the authentication information for locking or unlocking the vehicle or the facilities in accordance with the use reservation of the vehicle or the facilities, and the first sending unit is configured to send the first signal to the first server when a user performs an operation on the portable terminal during execution of the application program that is administered by the second server.

* * * * *

UNITED STATES PATENT AND TRADEMARK OFFICE
CERTIFICATE OF CORRECTION

| | |
|---|---|
| PATENT NO. | : 11,380,149 B2 |
| APPLICATION NO. | : 16/434422 |
| DATED | : July 5, 2022 |
| INVENTOR(S) | : Yuichiro Haruna |

It is certified that error appears in the above-identified patent and that said Letters Patent is hereby corrected as shown below:

On the Title Page

Item (30), the Foreign Application Priority Data should read:
--(30) Foreign Application Priority Data
Jun. 28, 2016 (JP)................... 2016-128205--

Signed and Sealed this
Eleventh Day of October, 2022

*Katherine Kelly Vidal*

Katherine Kelly Vidal
*Director of the United States Patent and Trademark Office*